US011220520B2

(12) United States Patent
Tellmann et al.

(10) Patent No.: US 11,220,520 B2
(45) Date of Patent: Jan. 11, 2022

(54) METHOD FOR PREPARING PHOSPHORUS-CONTAINING α-AMINONITRILES

(71) Applicant: BASF SE, Ludwigshafen (DE)

(72) Inventors: Kilian Tellmann, Leverkusen (DE); Gunter Karig, Frankfurt (DE); Heike Ehrich, Berlin (DE); Michael Sebek, Rostock (DE)

(73) Assignee: BASF SE, Ludwigshafen (DE)

( * ) Notice: Subject to any disclaimer, the term of this patent is extended or adjusted under 35 U.S.C. 154(b) by 29 days.

(21) Appl. No.: 16/769,646

(22) PCT Filed: Dec. 14, 2018

(86) PCT No.: PCT/EP2018/084875
§ 371 (c)(1),
(2) Date: Jun. 4, 2020

(87) PCT Pub. No.: WO2019/121362
PCT Pub. Date: Jun. 27, 2019

(65) Prior Publication Data
US 2021/0179645 A1    Jun. 17, 2021

(30) Foreign Application Priority Data

Dec. 19, 2017   (EP) ..................... 17208492

(51) Int. Cl.
*C07F 9/32*     (2006.01)
*A01N 57/20*    (2006.01)

(52) U.S. Cl.
CPC ............ *C07F 9/3211* (2013.01); *A01N 57/20* (2013.01)

(58) Field of Classification Search
CPC ................ C07F 9/3211; A01N 57/20
USPC ......................................... 568/14
See application file for complete search history.

(56) References Cited

U.S. PATENT DOCUMENTS

| 4,168,963 A | 9/1979 | Rupp et al. |
| 4,521,348 A | 6/1985 | Finke et al. |
| 4,599,207 A | 7/1986 | Lachhein et al. |
| 4,692,541 A | 9/1987 | Zeiss et al. |
| 6,359,162 B1 | 3/2002 | Willms |

FOREIGN PATENT DOCUMENTS

| CA | 1231103 A | 1/1988 |
| CN | 102399240 A | 4/2012 |
| CN | 105218579 A | 1/2016 |
| DE | 2717440 A1 | 12/1977 |
| EP | 0011245 A1 | 5/1980 |
| EP | 0121226 A1 | 10/1984 |
| EP | 0382114 A2 | 8/1990 |
| WO | WO-2015/173146 A1 | 11/2015 |
| WO | WO-2017/037009 A1 | 3/2017 |
| WO | WO-2017/037012 A1 | 3/2017 |
| WO | WO-2017/037033 A1 | 3/2017 |
| WO | WO-2017/037034 A1 | 3/2017 |
| WO | WO-2019/015909 A1 | 1/2019 |
| WO | WO-2019/121362 A1 | 6/2019 |

OTHER PUBLICATIONS

Anonymous, "Coefficient of Variation (CoV)", Statiflo Corporation, XP002782113, 2 pages.
European Search Report for EP Patent Application No. 17208492.3, dated Jul. 3, 2018, 4 pages.
International Patent Application No. PCT/EP2018/084875, International Search Report, dated Mar. 7, 2019.
International Patent Application No. PCT/EP2018/084875, International Preliminary Report on Patentability, dated Dec. 4, 2019.

*Primary Examiner* — Deborah D Carr
(74) *Attorney, Agent, or Firm* — Marshall, Gerstein & Borun LLP

(57) ABSTRACT

The present invention relates primarily to processes conducted in a continuously operated reactor for preparing particular phosphorus-containing α-aminonitriles of the formulae (Ia) and (Ib) defined hereinafter from corresponding phosphorus-containing cyanohydrin esters and to the use thereof for preparation of glufosinate or of glufosinate salts. The present invention further relates to a process for producing glufosinate/glufosinate salts.

20 Claims, No Drawings

METHOD FOR PREPARING PHOSPHORUS-CONTAINING α-AMINONITRILES

CROSS-REFERENCE TO RELATED APPLICATIONS

This is the U.S. national phase of International Application No. PCT/EP2018/084875, filed Dec. 14, 2018, which claims the benefit of European Patent Application No. 17208492.3, filed on Dec. 19, 2017.

The present invention relates primarily to processes conducted in a continuously operated reactor for preparing particular phosphorus-containing α-aminonitriles of the formulae (Ia) and (Ib) defined hereinafter from corresponding phosphorus-containing cyanohydrin esters and to the use thereof for preparation of glufosinate or of glufosinate salts. The present invention further relates to a process for producing glufosinate/glufosinate salts.

Phosphorus-containing cyanohydrin esters are valuable intermediates in various industrial fields, in particular for preparation of biologically active substances which can be employed in the pharmaceutical/agrochemical sector.

U.S. Pat. No. 4,168,963 describes the preparation of various phosphorus-containing and herbicidally active compounds, among which in particular phosphinothricin (2-amino-4-[hydroxy(methyl)phosphinoyl]butanoic acid; common name: glufosinate, referred to hereinafter as glufosinate) and the salts thereof have attained commercial significance in the agrochemical sector.

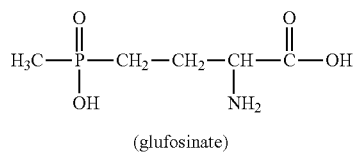

(glufosinate)

Methods for preparation of intermediates for synthesis of such phosphorus-containing herbicidally active compounds, in particular of glufosinate, are described in U.S. Pat. Nos. 4,521,348, 4,599,207 and 6,359,162 B1, for example. Publications WO 2015/173146, WO 2017/037033, WO 2017/037034, WO 2017/037009 and WO 2017/037012 describe further-improved process variants for preparation of phosphorus-containing cyanohydrins or cyanohydrin esters.

CA1231103 (corresponding to EP 0 121 226) describes a process for preparing phosphinothricin by treatment of 4-(hydroxymethylphosphinyl)-2-oxobutyric acid in the presence of a hydrogenation catalyst in a hydrogen atmosphere with ammonia or primary amines.

U.S. Pat. No. 4,521,348 (corresponding to EP 0 011 245) primarily describes processes for preparing phosphorus-containing cyanohydrin derivatives and, with reference to published specification DE 27 17 440 (corresponding to U.S. Pat. No. 4,168,963), the schematic reaction of isobutyl (3-cyano-3-hydroxypropyl)methylphosphinate with ammonia and water (similarly to the manner in WO 2015/173146).

U.S. Pat. No. 4,692,541 discloses processes for preparing phosphorus-containing α-aminonitriles by reaction of acylals with alkali metal cyanides under Strecker synthesis conditions using ammonium chloride (NH$_4$Cl) and concentrated aqueous ammonia solution (about 25%). This document further states that, by the process described in U.S. Pat. No. 4,521,348 (corresponding to EP 0 011 245), after the reaction of isobutyl (3-cyano-3-acetoxypropyl)methylphosphinate with 1.) NH$_3$, then with 2.) KOH and 3.) H$_2$SO$_4$, glufosinate is obtained in a yield of about 85%.

CN102399240A describes an improved process for preparing glufosinate-ammonium, including the reaction of acrolein cyanohydrin acetate with ethyl methyl phosphinate in the presence of a free-radical former, followed by aminolysis of the crude product obtained with a mixture of ammonium chloride (NH$_4$Cl) and 25% aqueous ammonia to give the α-aminonitrile.

The processes from the prior art for preparation of phosphorus-containing α-aminonitriles from corresponding phosphorus-containing cyanohydrin esters do allow the preparation of the desired phosphorus-containing α-aminonitriles, sometimes in very good yield, but still have disadvantages in relation to employability on the industrial production scale, for example excessively low space-time yields, high stoichiometric use of starting materials such as ammonia, too high a proportion of co-products or by-products (and the associated disposal, for example wastewater treatment) and excessively high complexity in the purification and isolation of the phosphorus-containing α-aminonitriles (for example as a result of the undesirably high salt burden and the complexity necessary in the filtration as a result).

The problem addressed by the present invention was therefore that of finding a process for preparing phosphorus-containing α-aminonitriles from corresponding phosphorus-containing cyanohydrin esters which affords the phosphorus-containing α-aminonitriles in at least comparable or better chemical yield compared to the prior art processes and improves one, more than one or all of the aforementioned disadvantages, especially allows an improved space-time yield, enables reduced use of starting materials such as ammonia, a lower proportion of co- or by-products, and preferably an improved reaction regime, for example in relation to economic, environmentally relevant and/or quality-relevant aspects.

This problem is solved by the process of the invention described hereinafter.

The present invention provides a continuous process for preparing a mixture comprising at least one compound of the formula (Ia) and at least one compound of the formula (Ib)

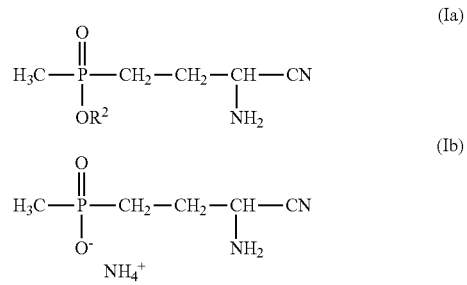

characterized in that one or more compounds of the formula (II)

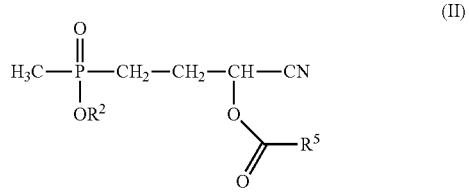

wherein in each case:
$R^2$ is $(C_1$-$C_{12})$-alkyl, $(C_1$-$C_{12})$-haloalkyl, $(C_6$-$C_{10})$-aryl, $(C_6$-$C_{10})$-haloaryl, $(C_7$-$C_{10})$-aralkyl, $(C_7$-$C_{10})$-haloaralkyl, $(C_4$-$C_{10})$-cycloalkyl or $(C_4$-$C_{10})$-halocycloalkyl,
$R^5$ is $(C_1$-$C_{12})$-alkyl, $(C_1$-$C_{12})$-haloalkyl, $(C_6$-$C_{10})$-aryl, $(C_6$-$C_{10})$-haloaryl, $(C_7$-$C_{10})$-aralkyl, $(C_7$-$C_{10})$-haloaralkyl, $(C_4$-$C_{10})$-cycloalkyl or $(C_4$-$C_{10})$-halocycloalkyl,
are converted in a continuously operated reactor while mixing with $NH_3$ in liquid or supercritical form, where the mixing of the compound(s) of the formula (II) and $NH_3$ is effected under the following parameters:
the mixing time for attainment of a coefficient of variation of 0.10 or less (CoV≤$10^{-1}$) is less than 30 seconds.

By the processes of the invention, especially in one of the configurations of the processes of the invention described as preferred and as particularly preferred, the mixtures comprising the phosphorus-containing α-aminonitriles of the formulae (Ia) and (Ib) are prepared with an improved space-time yield, reduced use of starting materials such as ammonia, improved process economy (for example improved workup of the reaction through reduced filtration complexity), a smaller proportion of co- or by-products, and hence with an improved reaction regime.

Overall, the processes of the invention, including the further process of the invention described hereinafter for preparation of glufosinate, give rise to fewer unwanted co- and by-product components with reduced use of starting materials, and so the processes of the invention are more efficient, more energy-saving and more environmentally benign.

The coefficient of variation CoV characterizes the distribution of the individual components in a mixture on the basis of differences in concentration. A coefficient of variation (CoV) of 0 represents an ideal, completely homogeneous mixture, whereas a coefficient of variation (CoV) of 1 represents no mixing.

The coefficient of mixing is the counterpart to the coefficient of variation: a coefficient of mixing of 1 represents an ideal, completely homogeneous mixture, whereas a coefficient of mixing of 0 represents no mixing (see, for example, "Chemietechnik" [Chemical Technology] by Eckhard Ignatowitz, 8th edition (2007), page 314).

In the case of the reaction of 3-[n-butoxy(methyl)phosphoryl]-1-cyano-1-propyl acetate (ACM), a compound of the formula (II), and ammonia, a continuous process regime by comparison with a batchwise process regime (metering-controlled addition of NH3, semi-batchwise) surprisingly enables an increase in the in situ yield of glufosinate-sodium, based on the ACM used, from about 93% to about 97%, which corresponds roughly to halving of the secondary components. This surprising improvement is probably attributable to shorter contact times and a more advantageous residence time distribution, and preferably somewhat higher reaction temperatures.

The process of the invention is therefore conducted in a continuous process regime, i.e. in a continuously operated reactor.

In the context of the present invention a continuous process regime shall be understood to mean that compounds (i.e. reactants such as compounds of the formula (II) and ammonia) are introduced into the reactor (input/feed) and at the same time, but spatially separated therefrom, compounds (i.e. products such as compounds of the formulae (Ia) and (Ib)) are discharged from the reactor (discharge/drain).

In a batchwise process regime, by contrast, the steps of introducing reactants (i.e. compounds of the formula (II) and ammonia), conversion (i.e. reaction of the reactants) and discharging of the products (i.e. products such as compounds of the formulae (Ia) and (Ib)) from the reactor are effected consecutively or with overlap only in individual phases. These are also understood to include the semibatchwise process regime (dosage-controlled mode), wherein the introduction of $NH_3$ into the initial change of ACM is effected essentially with the reaction proceeding simultaneously to form mixtures comprising compounds of the formulae (Ia) and (Ib).

The mixing in connection with a process of the invention can be effected by methods known to the person skilled in the art, preferably by stirring, pumped circulation or pumping by means of static mixers (SMX mixers from Sulzer, cascade mixers from Ehrfeld Mikrotechnik etc.), and it is additionally possible to use baffles in each case.

Preferably, a process of the invention is conducted in a tubular reactor, optionally with baffles or static mixer inserts, for example, in the case of the MIPROWA reactor from Ehrfeld Mikrotechnik BTS GmbH that was used in in-house experiments, a triple comb layer per channel. By contrast with the continuously operated stirred reactor, for example, the continuously operated tubular reactor avoids backmixing and is therefore to be used with preference. For attainment of required mixing parameters from commencement of the introduction of the reactants onward, it is appropriate on the laboratory scale, for example, to connect a micromixer upstream of the tubular reactor.

An ideal plug flow reactor (PFR) is an idealized tubular reactor in which there is what is called a plug flow. The assumption here is that, in plug flow, the reaction mixture is perfectly mixed in radial direction, but there is no mixing in axial direction. This flow can be imagined as a series of infinitely thin slivers (plugs) of the reaction mixture that "migrates" through the tube in axial direction. There is no mass transfer or heat transfer between these slivers, and so each sliver has a different composition than the respectively adjacent slivers. Within each sliver, the composition is homogeneous, meaning that all concentrations and the temperature are the same. The conversions of matter take place within the flow pathway; the concentration of the substances changes correspondingly along the tube.

In the context of the present invention, a "tubular reactor" is understood to mean a reactor in which the length of the through-flow reactor is more than 100 times the characteristic length.

The characteristic length (l_char) is understood to mean the diameter in the case of a round cross-section reactor area, and the side lengths of the square in the case of a square cross-sectional reactor area.

In the case of a rectangular cross-sectional reactor area, the characteristic length (l_char) is the geometric average of length (a) and width (b) of the rectangular cross section (i.e. l_char=the square root of the product of a*b).

Cross-sectional reactor area refers in each case to the area orthogonal to flow direction.

In the context of the present invention, the continuously operated reactor is a tubular reactor having a length of more than 300 times the characteristic length, preferably more than 1000 times the characteristic length, further preferably more than 3000 times the characteristic length and more preferably more than 10 000 times the characteristic length.

Microreactors offer various advantages over conventional reactors. They are notable for a high surface-to-volume ratio, which results in high specific mass transfer and heat exchange performance. They permit a very accurately controllable, continuous process regime, short residence time of the reactants and the products, better control of reactions that proceed rapidly, and rapid further processing of short-lived or unstable intermediates.

The reactor volume is preferably at least 1 liter, preferably at least 2 liters, further preferably at least 5 liters, and even further preferably at least 10 liters. At the same time, the reactor volume is preferably at most 50 m³, more preferably at most 15 m³, further preferably at most 5 m³.

Relatively short contact times are advantageous since the phosphorus-containing α-amino nitriles of the formulae (Ia) and (Ib) are not stable substances either from a safety or from a quality point of view. The relatively low level of backmixing in the continuous process regime, preferably in a tubular reactor, reduces unfavorable and unwanted side reactions. Higher reaction temperatures also favor lower formation of the cyanohydrin formed as an intermediate, and at the same time also result in attenuation of the unwanted hydrolysis of the phosphinic ester. The latter effect additionally opens up the potential of working with smaller excesses of $NH_3$, which, as well as lower consumption of the ammonia ($NH_3$) raw material, also leads to a reduction in the amount of ammonium chloride ($NH_4Cl$) obtained as a coproduct in the preparation of glufosinate. Furthermore, in a continuous process regime, firstly the potential endangerments associated with higher reaction temperatures and secondly the associated higher rates of heat release on the (large) industrial scale are easier to control than in the case of a corresponding batchwise process regime.

For a process of the invention, it is preferably the case that the mixing is effected with the following parameters:
the mixing time for attainment of a coefficient of variation of 0.05 or less (CoV≤5*10⁻²) is less than 15 seconds.

For a process of the invention, it is more preferably the case that the mixing is effected with the following parameters:
the mixing time for attainment of a coefficient of variation of 0.05 or less (CoV≤5*10⁻²) is less than 4 seconds.

For a process of the invention, it is further preferably the case that the mixing is effected with the following parameters:
the mixing time for attainment of a coefficient of variation of 0.05 or less (CoV≤5*10⁻²) is less than 1 second.

The average hydrodynamic residence time in the reactor in a process of the invention is preferably in the range from 1 minute to 8 hours. According to the reactor type and reactor configuration, the average hydrodynamic residence time in the reactor is preferably in the range from 3 to 180 minutes, more preferably in the range from 6 to 90 minutes, and most preferably in the range from 10 to 60 minutes.

A process of the invention is especially also suitable for performance on the industrial scale.

The respective alkyl radicals of the radicals $R^2$ and $R^5$ may have a straight-chain or branched-chain (branched) carbon skeleton.

The expression "($C_1$-$C_4$)-alkyl" is the brief notation for an alkyl radical having 1 to 4 carbon atoms, i.e. encompasses the radicals methyl, ethyl, 1-propyl, 2-propyl, 1-butyl, 2-butyl, 2-methylpropyl or tert-butyl. General alkyl radicals having a larger specified range of carbon atoms, for example "($C_1$-$C_6$)-alkyl", correspondingly also encompass straight-chain or branched alkyl radicals having a greater number of carbon atoms, i.e. in this example also the alkyl radicals having 5 and 6 carbon atoms.

The expression "($C_4$-$C_5$)-alkyl" is the brief notation for an alkyl radical having 4 or 5 carbon atoms, i.e. encompasses the n-butyl, isobutyl, sec-butyl, tert-butyl, n-pentyl, isopentyl, sec-pentyl and neopentyl radicals.

"Halogen" preferably refers to the group consisting of fluorine, chlorine, bromine and iodine. Haloalkyl, haloaryl, haloaralkyl and halocycloalkyl respectively refer to alkyl, aryl, aralkyl and cycloalkyl partially or completely substituted by identical or different halogen atoms, preferably from the group fluorine, chlorine and bromine, in particular from the group fluorine and chlorine. Thus haloalkyl encompasses for example monohaloalkyl (=monohalogenalkyl), dihaloalkyl (=dihalogenalkyl), trihaloalkyl (=trihalogenalkyl) or else perhaloalkyl, for example $CF_3$, $CHF_2$, $CH_2F$, $CF_3CF_2$, $CH_2FCHCl$, $CCl_3$, $CHCl_2$, $CH_2CH_2Cl$. The same applies for the other halogen-substituted radicals.

The preparation of the phosphorus-containing cyanohydrin esters of the formula (II) is known to those skilled in the art and can be effected by methods known from the literature (for example according to the documents cited at the outset).

For the formulae (Ia) and (II) in connection with the processes of the invention, it is preferably the case that
$R^2$ is ($C_3$-$C_6$)-alkyl, and
$R^5$ is ($C_1$-$C_4$)-alkyl, ($C_6$-$C_8$)-aryl or ($C_5$-$C_8$)-cycloalkyl.

For the formulae (Ia) and (II) in connection with the processes of the invention, it is more preferably the case that
$R^2$ is ($C_4$-$C_5$)-alkyl, and
$R^5$ is methyl, ethyl or isopropyl.

For the formulae (Ia) and (II) in connection with the process of the invention, it is especially preferably the case that
$R^2$ is n-butyl, isobutyl, n-pentyl or isopentyl, and
$R^5$ is methyl.

For the formulae (Ia) and (II) in connection with the process of the invention, it is especially preferably the case that
$R^2$ is n-butyl, and
$R^5$ is methyl.

The process of the invention is preferably conducted in such a way that a total amount of 2.0 to 3.6 molar equivalents of $NH_3$ is used, based on the amount of compounds of the formula (II) used.

The process of the invention is more preferably conducted in such a way that a total amount of 2.2 to 3.2 molar equivalents of $NH_3$ is used, based on the amount of compounds of the formula (II) used.

The process of the invention is especially preferably conducted in such a way that a total amount of 2.4 to 2.8 molar equivalents of $NH_3$ is used, based on the amount of compounds of the formula (II) used.

The process of the invention is preferably conducted in such a way that the $NH_3$ used is essentially anhydrous, since the advantages of the processes of the invention mentioned at the outset, especially in relation to an improved space-time yield, reduced use of starting materials such as ammonia, a lower proportion of co- or by-products, and an improved reaction regime, can be achieved to a particular degree.

In connection with the processes of the invention, the $NH_3$ used is preferably essentially anhydrous, meaning that the water content in the $NH_3$ used is not more than 0.5% by weight, regularly not more than 0.25% by weight, and frequently not more than 0.1% by weight.

The process of the invention is preferably conducted in such a way that the reaction is effected without addition of ammonium chloride (NH$_4$Cl) and/or without addition of water.

In-house experiments have shown that the addition of ammonium chloride (NH$_4$Cl) does not have any advantageous effects on the process of the invention and in that respect is dispensable. Since the further preparation of glufosinate and salts thereof, by the processes known in the literature, generally includes a filtration step for removal of by- or co-products in salt form that have been formed in the course of the reaction, dispensing with the addition of ammonium chloride in processes of the invention means a further improvement in the reaction regime, particularly with regard to a later filtration.

The process of the invention is preferably conducted in such a way that one or more compounds of formula (II) as defined above, preferably one or more of the compounds of the formula (II) defined as preferred or particularly preferred, and NH$_3$, each in liquid form, are mixed in the reactor.

The process of the invention is preferably conducted in such a way that the reaction is effected at a temperature in the range from 10 to 80° C., preferably at a temperature in the range from 15 to 75° C.

The process of the invention is more preferably conducted in such a way that the reaction is effected at a temperature in the range from 20 to 70° C., more preferably at a temperature in the range from 25 to 65° C.

The mixtures comprising the phosphorus-containing α-aminonitriles of the formulae (Ia) and (Ib) that have been formed in accordance with the invention can be used as starting materials for synthesis of phosphorus-containing amino acids, for example glufosinate (such a synthesis route is described in detail further down).

It is further possible to conduct the process of the invention under elevated pressure or under reduced pressure preference being given to processes of the invention under elevated pressure especially since the NH$_3$ is preferably used in liquid (or optionally in supercritical) form.

The process of the invention is preferably conducted in such a way that the reaction is effected at an absolute pressure (pabs) of not more than 120 bar, preferably at an absolute pressure of not more than 80 bar, further preferably at an absolute pressure of not more than 40 bar. This pressure depends in particular on the reaction temperature chosen in each case.

According to the choice of reaction parameters (especially molar ratio of compounds of the formula (II) and NH$_3$, the amount of water present and released in the reaction, and the associated reaction temperature and reaction time), the mixture prepared in accordance with the invention contains different proportions of compounds of the formula (Ia) and of the formula (Ib). The proportion of compound (Ia) is regularly 10 to 90 mol %, and in most cases the proportion of the compound (Ia) is 20 to 80 mol %, based in each case on the total amount of compounds of the formula (Ia) and formula (Ib).

Under the present preferred and particularly preferred reaction conditions, the proportion of the compound (Ia) is regularly 30 to 80 mol %, the proportion of the compound (Ia) is frequently 40 to 80 mol %, and the proportion of the compound (Ia) is usually 50 to 80 mol %, based in each case on the total amount of compounds of the formula (Ia) and (Ib).

According to the reaction procedure, especially reaction time and amount of NH$_3$ used, the proportion of the compound (Ia) may be 60 mol % or more, or else 70 mol % or more, based in each case on the total amount of compounds of the formula (Ia) and (Ib).

The process of the invention for preparation of the mixtures comprising the phosphorus-containing α-aminonitriles of the formulae (Ia) and (Ib) is preferably applicable to the formulae (Ia) and (II) in which
R$^2$ is (C$_4$-C$_5$)-alkyl, and
R$^5$ is methyl, ethyl or isopropyl,
using a total of 2.2 to 3.6 molar equivalents of NH$_3$, based on the amount of compounds of the formula (II) used, the continuous reactor being a tubular reactor having a length of more than 100 times the characteristic length, where the reaction is effected at a temperature in the range from 10 to 80° C., preferably at a temperature in the range from 15 to 75° C., where preferably one, more than one or all of the following parameters are additionally applicable: the reaction is effected without addition of ammonium chloride (NH$_4$Cl), the reaction is effected without addition of water, the NH$_3$ used is essentially anhydrous, and/or the reaction is effected at an absolute pressure (pabs) of not more than 120 bar.

The process of the invention for preparation of the mixtures comprising the phosphorus-containing α-aminonitriles of the formulae (Ia) and (Ib) is preferably applicable to the formulae (Ia) and (II) in which
R$^2$ is (C$_4$-C$_5$)-alkyl, and
R$^5$ is methyl, ethyl or isopropyl,
using a total of 2.2 to 3.2 molar equivalents of NH$_3$, based on the amount of compounds of the formula (II) used, the continuous reactor being a tubular reactor having a length of more than 100 times the characteristic length, where the reaction is effected at a temperature in the range from 15° C. to 75° C., the reaction is effected without addition of ammonium chloride (NH$_4$Cl), the reaction is effected without addition of water, the NH$_3$ used is essentially anhydrous, and the reaction is effected at an absolute pressure (pabs) of not more than 120 bar.

The process of the invention for preparation of the mixtures comprising the phosphorus-containing α-aminonitriles of the formulae (Ia) and (Ib) is especially preferably applicable to the formulae (Ia) and (II) in which
R$^2$ is n-butyl, isobutyl, n-pentyl or isopentyl (preferably in turn n-butyl), and
R$^5$ is methyl,
using a total of 2.2 to 3.2 molar equivalents of NH$_3$, based on the amount of compounds of the formula (II) used, the continuous reactor being a tubular reactor having a length of more than 300 times the characteristic length, where the reaction is effected at a temperature in the range from 20° C. to 70° C., more preferably at a temperature in the range from 25° C. to 65° C., where preferably one, more than one or all of the following parameters are additionally applicable:
the reaction is effected without addition of ammonium chloride (NH$_4$Cl),
the reaction is effected without addition of water,
the NH$_3$ used is essentially anhydrous, and/or the reaction is effected at an absolute pressure (pabs) of not more than 80 bar.

The process of the invention for preparation of the mixtures comprising the phosphorus-containing α-aminonitriles of the formulae (Ia) and (Ib) is especially preferably applicable to the formulae (Ia) and (II) in which $R^2$ is n-butyl, isobutyl, n-pentyl or isopentyl (preferably in turn n-butyl), and
$R^5$ is methyl,
using a total of 2.2 to 3.2 molar equivalents of $NH_3$, based on the amount of compounds of the formula (II) used, the continuous reactor being a tubular reactor having a length of more than 1000 times the characteristic length, where the reaction is effected at a temperature in the range from 25° C. to 65° C., the reaction is effected without addition of ammonium chloride ($NH_4Cl$), the reaction is effected without addition of water, the $NH_3$ used is essentially anhydrous, and the reaction is effected at an absolute pressure (pabs) of not more than 40 bar.

The process of the invention for preparation of the mixtures comprising the phosphorus-containing α-aminonitriles of the formulae (Ia) and (Ib) is very especially preferably applicable to the formulae (Ia) and (II) in which
$R^2$ is n-butyl, isobutyl, n-pentyl or isopentyl (preferably in turn n-butyl), and
$R^5$ is methyl,
using a total of 2.4 to 2.8 molar equivalents of $NH_3$, based on the amount of compounds of the formula (II) used, the continuous reactor being a tubular reactor having a length of more than 3000 times the characteristic length, where the reaction is effected at a temperature in the range from 25° C. to 65° C., the reaction is effected without addition of ammonium chloride ($NH_4Cl$), the reaction is effected without addition of water, the $NH_3$ used is essentially anhydrous, and the reaction is effected at an absolute pressure (pabs) in the range of not more than 40 bar. The process of the invention can be conducted in an optional diluent.

Optional diluents usable are in principle water or various organic and/or inorganic solvents. Preferably, the process of the invention is conducted without use or addition of such diluents, with regard also, but not exclusively, to the space-time yield (as already mentioned above).

The schematic diagram below in Scheme 1 illustrates the conversion of compounds of the formula (II) to compounds of the formulae (Ia) and (Ib), where $R^2$ and $R^5$ each have the definition given above, and the co-products (water and amide $R^5CONH_2$) and the secondary components (mainly alcohol $R^2OH$ and ester $R^5COOR^2$).

Scheme 1

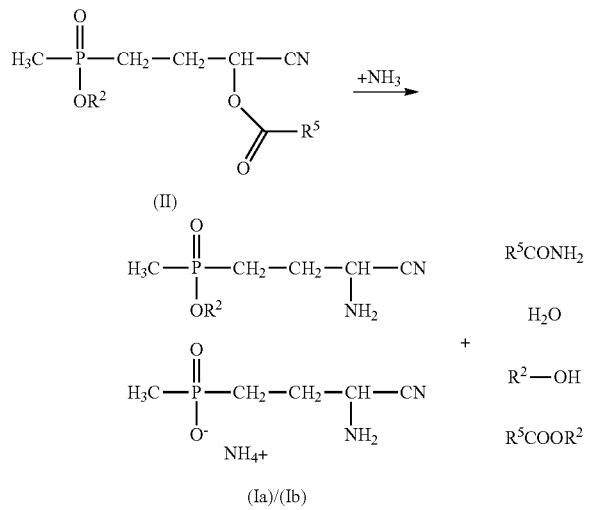

Glufosinate salts in the context of the present invention are preferably ammonium salts, phosphonium salts, sulfonium salts, alkali metal salts and alkaline earth metal salts of glufosinate, and salts of glufosinate with hydrohalic acids or oxo acids, for example sulfuric acid.

Especially preferred in the context of the present invention are glufosinate, glufosinate sodium and glufosinate ammonium, and glufosinate hydrochloride.

In a further aspect the present invention relates to the production of glufosinate

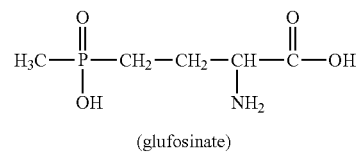

(glufosinate)

or glufosinate salts, characterized in that, in this process, a mixture comprising at least one compound of the formula (Ia) and at least one compound of the formula (Ib) is used

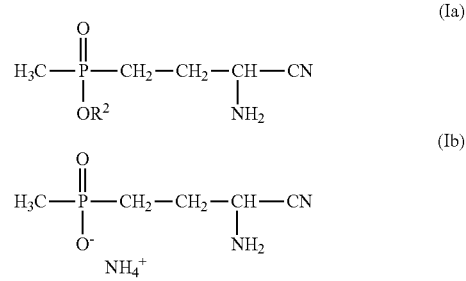

where $R^2$ has the meaning defined in accordance with the invention above, preferably the meaning defined as preferable above and more preferably the meaning defined as particularly preferable above, and
this mixture used is prepared by the process of the invention, preferably in one of the configurations described as preferred or particularly preferred above.

The present invention further relates to a process for preparing glufosinate or glufosinate salts, especially glufosinate, glufosinate-sodium, glufosinate hydrochloride or glufosinate-ammonium, comprising the following steps (a) and (b):

(a) preparing a mixture comprising at least one compound of the formula (Ia) and at least one compound of the formula (Ib) as defined above in accordance with the invention, preferably as defined above as preferred, and more preferably as defined above as particularly preferred, this mixture being prepared by the process of the invention, preferably in one of the configurations described as preferred or as particularly preferred above,
and
(b) converting the mixture prepared in step (a) and comprising at least one compound of the formula (Ia) and at least one compound of the formula (Ib) to glufosinate or to glufosinate salts, especially to glufosinate, glufosinate-sodium, glufosinate hydrochloride or glufosinate-ammonium,
or
(b) using the mixture prepared in step (a) and comprising at least one compound of the formula (Ia) and at least one compound of the formula (Ib) for preparation of glufosinate or of glufosinate salts, especially of glufosinate, glufosinate-sodium, glufosinate hydrochloride or glufosinate-ammonium.

The process of the invention, preferably in one of the configurations described as preferred or as particularly preferred, for preparation of glufosinate or of glufosinate salts, is preferably conducted in such a way that, in step (b), an acidic hydrolysis of the nitrile group and the phosphinic ester group to compounds of the formula (Ia) and an acidic hydrolysis of the nitrile group to compounds of the formula (Ib) are effected, these hydrolyses preferably being effected with a mineral acid, and in turn preferably with aqueous HCl (hydrochloric acid).

This latter process step of the process of the invention for preparation of glufosinate and/or glufosinate salts can be effected in a known manner as described, for example, in CN102399240A.

Finally, the present invention also relates to the use of a mixture prepared by a process of the invention (preferably in one of the configurations described as preferred or as particularly preferred), in each case comprising at least one compound of the formulae (Ia) and (Ib), as defined above, for preparation of glufosinate or of glufosinate salts, especially of glufosinate, glufosinate-sodium, glufosinate hydrochloride or glufosinate-ammonium.

The examples which follow elucidate the present invention.

EXAMPLES

In the course of the in-house studies, experiments were conducted in order to enable direct comparability of batchwise and continuous process regime on the laboratory scale. In addition, the products from the aminolysis were converted to glufosinate-ammonium in order to be able to better detect differences in the yield of glufosinate-ammonium on the basis of in situ yields than would have been possible on the basis of the phosphorus-containing α-amino nitriles of the formulae (Ia) and (Ib). Furthermore, the experimental results were ascertained by uniform analysis.

All data are based on weight unless otherwise stated.

The water content in the $NH_3$ used was never more than 0.25% by weight, and usually not more than 0.1% by weight.

ABBREVIATIONS USED

ACM: 3-[n-butoxy(methyl)phosphoryl]-1-cyanopropyl acetate, compound of the formula (II)
AMN: n-butyl (3-amino-3-cyanopropyl)methylphosphinate, compound of the formula (Ia)
GFA: glufosinate-ammonium
GFA-is: in-situ yield of glufosinate-ammonium
conti-reactor: reactor operated by means of a continuous process regime

Example A1: Fully Continuous Process Regime

The reaction system was composed of the following reactor sections arranged in series:
i.) micromixer, as main mixer for the ACM and liquid ammonia reactants (cascade mixer 2, Ehrfeld Mikrotechnik BTS GmbH);
ii.) MIPROWA reactor with three comb sections in a crossed arrangement per channel in the interior (comb elements in 700 μm, comb element separations 1500 μm, comb element angle) 45°, as heat exchanger and post-mixer (MIPROWA LAB reactor A4, Ehrfeld Mikrotechnik BTS GmbH);
iii.) flow tube with internal diameter 1.58 mm and variable length: 0 m (i.e. not used), 10 m, 20 m or 40 m (according to volume required, i.e. further reaction time).

The mixing time to attain a coefficient of variation of 0.05 or less ($CoV \le 5*10^{-2}$) was less than 4 seconds, and usually less than 1 second.

All reactor sections except i.) were operated under temperature control. For details of temperature control of reactor sections ii) and iii), reference is made to table 1 below. The micromixer (reactor section i)) was operated at ambient temperature (about 20° C.); the volume of the micromixer was <1/100 of the total reactor volume.

Before each experiment, the entire reaction system was purged with ACM and the desired ACM flow rate was established. Ammonia gas was liquefied under pressure and pumped constantly in the direction of the reaction system by means of an HPLC metering pump, the flow rate of which was regulated by means of a mini-Coriolis mass flow meter. The ammonia conduit to the reactor was purged with liquid $NH_3$ prior to the start of the experiment in order to lead off residues of inert gas and ammonia gas by bypass. Subsequently, in the bypass position, a constant ammonia pressure and flow rate was built up.

The technical grade ACM (the ACM content was 90% by weight) was conveyed continuously into the reactor from a reservoir vessel. Subsequently, the ammonia stream was switched from bypass to reactor and hence the aminolysis was started. The reactant streams were chosen such that the corresponding residence times in the continuously operated reactor were attained. The mass flow rates were typically in the range of 3.2-10.9 g/min (based on the technical grade ACM) or 0.5-1.8 g/min (based on liquid $NH_3$). As well as the adjustment of the mass flow rates or volume flow rates and of the temperatures, the volumes of the reactor were also varied in order to establish different residence time. The molar $NH_3$/ACM ratio was always 2.77.

Table 1 shows an overview of the different residence times and reaction temperatures in the case of fully continuous aminolysis.

In order to prevent degassing of as yet unconverted ammonia under reaction conditions, the pressure at the end (the outlet) of the continuous reactor was always set to 21 bar. At this minimum pressure in the plant, pure ammonia reaches its boiling point at 51° C. Outgassing of unconverted ammonia was never observed at the reactor outlet under reaction conditions, not even at the higher temperatures.

After passing through the reactor sections, the product mixture obtained was quenched directly. For this purpose, the liquid stream obtained was introduced into a stirred initial charge of hydrochloric acid solution without immersion of the introduction pipe into the hydrochloric acid. The heat of neutralization released was removed by cooling in an ice bath, and the temperature did not exceed 40° C.

Example A2: Predominantly Continuous Process Regime

The procedure for experiments with predominantly continuous process regime corresponded largely to that of example A1. In a departure from the fully continuous process regime described in example A1, in this case, the product stream exiting from the continuous reactor was collected unquenched in a discontinuously operated receiver, where it reacted further. This process regime was referred to as predominantly continuous since the majority of the ACM conversion takes place in the continuously operated part of the reactor under the reaction conditions used.

In this variant, the reaction system was composed of the following reactor sections connected in series:

i.) micromixer, as main mixer for the ACM and liquid ammonia reactants (cascade mixer 2, Ehrfeld Mikrotechnik BTS GmbH);

ii.) MIPROWA reactor with three comb sections in a crossed arrangement per channel in the interior (comb elements in 700 µm, comb element separations 1500 µm, comb element angle) 45°, as heat exchanger and post-mixer (MIPROWA LAB reactor A4, Ehrfeld Mikrotechnik BTS GmbH);

iii.) flow tube with internal diameter 1.58 mm and variable length: 0 m (i.e. not used), 10 m, 20 m or 40 m (according to volume required, i.e. further reaction time);

iv.) autoclave (series 5500, Parr) with total volume 300 ml.

The mixing time to attain a coefficient of variation of 0.05 or less (CoV≤5*10$^{-2}$) was less than 4 seconds, and usually less than 1 second.

All reactor sections except i.) were operated under temperature control. For details of temperature control of reactor sections ii) and iii), reference is made to table 2 below. The micromixer (reactor section i)) was operated at ambient temperature (about 20° C.); the volume of the micromixer was <1/100 of the total reactor volume.

In a departure from the procedure according to the above example A1, after establishment of equilibrium in the continuous reactor, the product mixture from the continuous reactor was introduced directly into an autoclave (batch reactor) that was under an argon pressure of 21 bar (absolute) and had already been preheated (the initial products obtained beforehand were discarded) and stirred therein. During the filling of the autoclave, the plant pressure rose since the system was being operated in a closed manner. In the autoclave, a distinction was made between two times: the filling time for the introduction of the product stream ($t_{2F}$), and the further reaction time ($t_{2N}$) in which the mixture can react further.

Table 2 shows an overview of the different residence times, filling times and further reaction times and of the reaction temperatures in a predominantly continuous process regime for the aminolysis.

At the end of the chosen further reaction time, the product mixture (under pressure) was introduced through the sample tube of the autoclave rapidly into a stirred, ice bath-cooled reservoir containing hydrochloric acid under temperature control (max. 40° C.). This brings about immediate stoppage of the reaction (quenching). The autoclave was subsequently rinsed out with a calculated amount of hydrochloric acid and this mixture was combined with the already quenched product.

Comparative Example C1: Batchwise, Metering-Controlled Process Regime

The batchwise aminolysis of ACM was conducted in a 300 ml autoclave (series 5500, Parr). The autoclave was initially charged with 164.3 g (566 mmol or 150 ml) of technical grade ACM (the ACM content was 90% by weight), preheated and charged with argon. Subsequently, liquid ammonia, while stirring constantly (600 rpm) and while cooling, was metered in below the liquid surface. In this way, 26.7 g of $NH_3$ were introduced (1.57 mol) and hence a molar $NH_3$/ACM ratio of 2.77 was obtained. A metering time of four hours was chosen, one reason being to permit comparability with configuration variants on the industrial scale. The ammonia metering time was followed by a further reaction time for completion of the conversion, which was either 10 min or 60 min.

Table 3 shows an overview of the respective times and temperatures.

After the end of the further reaction time, as described in example A2, the product was introduced into hydrochloric acid and the same procedure was followed.

Hydrolysis, neutralization, content determination and reproduction of the reaction products from examples A1, A2 and C1

After leaving the reactor in example A1 or after the end of the further reaction time in example A2 or of comparative example C1, the reaction was stopped immediately by discharge into an initial charge of hydrochloric acid. The subsequent workup was effected by hydrolysis, which was conducted with 4.6 molar equivalents of HCl (per mole of ACM).

A previously weighed three-neck flask (500 or 1000 ml) with magnetic stirrer was initially charged with a previously weighed amount of 32% hydrochloric acid. Either the product of the aminolysis directly from the experimental plant of example A1 (100 g) or the entire contents of the autoclave from example A2 or C1 (190 g of product) via the sample tube thereof was guided directly in a dropwise manner onto the acid in the flask. The contents of the flask were cooled in an ice-water bath and mixed by magnetic stirrer (700 rpm). The addition was rapid; the temperature was kept at <40° C. An orange/yellow solution was obtained. After the dropwise addition or quantitative conversion, the total weight of the solution was determined. The mixture was stored in a refrigerator overnight.

The next day, the three-neck flask was equipped with a reflux condenser and dropping funnel with pressure equalization (dropping funnel between flask and condenser). The entire apparatus was purged with argon, stirred (600 rpm) and then boiled at reflux for 7 h. During the heating, a distillate with an organic upper phase and aqueous lower phase condensed out in the dropping funnel connected, and a portion of the lower phase was repeatedly discharged back into the flask. Organic coproducts, conversion products and by-products accumulate in the upper phase. After the hydrolysis for 7 hours, about 200 ml of distillate were removed, consisting of upper phase and lower phase. The upper phase was discarded. The mixture in the flask was cooled down to room temperature while stirring and left to stand overnight.

Solid substrate precipitated out overnight. The crystal cake was first stirred up with a glass rod and then stirred thoroughly by magnetic stirrer. The mixture was neutralized dropwise to pH 6.5 with 25% aqueous ammonia solution while cooling with ice water and stirring. The pH was determined by means of a pH electrode. Subsequently, a sufficient amount of water was added to dissolve all solids and there was a clear, orange solution at room temperature. The weight of the overall solution was determined (about 700 g). Accurately weighed samples thereof were taken, for the purpose of determination of GFA content in situ by HPLC.

All experiments were conducted more than once; therefore, the yields of GFA stated are averages of the yields of GFA in situ, both from multiple experiments and from analyses conducted repeatedly.

The yields of GFA in situ (identified as GFA-is) are shown in tables 1-3 below. In addition, tables 1 to 3 give an overview of the various residence times, filling times and further reaction times and of the reaction temperatures in a continuous, predominantly continuous and batchwise reaction regime for the aminolysis.

Elucidation of the abbreviations used in the tables:

| | |
|---|---|
| $T_{1M}$ | Temperature in the MIPROWA reactor |
| $\tau_{1M}$ | Average hydrodynamic residence time in the MIPROWA reactor |
| $T_{1S}$ | Temperature in the flow tube |
| $\tau_{1S}$ | Average hydrodynamic residence time in the flow tube |
| $\tau_{1\_total}$ | Average hydrodynamic residence time in the overall continuous reactor (contribution from micromixer negligible) |
| $T_2$ | Temperature in the autoclave |
| $0.5 * t_{2F}$ | Half the filling time of the autoclave |
| $t_{2N}$ | Further reaction time in the autoclave after filling |
| GFA-is | In situ yield of glufosinate-ammonium (GFA) |

TABLE 1

Reaction conditions and results from example A1

| Experiment No. | MIPROWA reactor | | Flow tube | | $\tau_{1\_total}$ [min] | GFA-is [%] |
|---|---|---|---|---|---|---|
| | $T_{1M}$ [°C.] | $\tau_{1M}$ [min] | $T_{1S}$ [°C.] | $\tau_{1S}$ [min] | | |
| A1.1 | 30 | 19.6 | 40 | 39.4 | 59.0 | 97-98 |
| A1.2 | 30 | 19.6 | 50 | 39.4 | 59.0 | 97-99 |
| A1.3 | 50 | 5.0 | 50 | 5.0 | 10.0 | 94-95 |
| A1.4 | 50 | 6.6 | 50 | 13.4 | 20.0 | 96-97 |
| A1.5 | 60 | 5.0 | 60 | 5.0 | 10.0 | 97-98 |
| A1.6 | 60 | 6.6 | 60 | 13.4 | 20.0 | 95-96 |

TABLE 2

Reaction conditions and results from example A2

| Experiment No. | MIPROWA reactor | | Flow tube | | | Autoclave | | | | | GFA-is [%] |
|---|---|---|---|---|---|---|---|---|---|---|---|
| | $T_{1M}$ [°C.] | $\tau_{1M}$ [min] | $T_{1S}$ [°C.] | $\tau_{1S}$ [min] | $\tau_{1\_total}$ [min] | $T_2$ [°C.] | $0.5 * t_{2F}$ [min] | $t_{2N}$ [min] | • [min] | R | |
| A2.1 | 30 | 5.0 | — | — | 5.0 | 50 | 6.6 | 10 | 21.6 | 0.30 | 94-95 |
| A2.2 | 30 | 6.6 | 30 | 13.4 | 20.0 | 50 | 8.9 | 10 | 38.9 | 1.06 | 95-96 |
| A2.3 | 40 | 3.4 | 40 | 1.6 | 5.0 | 50 | 4.5 | 10 | 19.5 | 0.34 | 96-97 |
| A2.4 | 40 | 5.0 | 40 | 5.0 | 10.0 | 50 | 6.7 | 10 | 26.7 | 0.60 | 96-97 |
| A2.5 | 50 | 5.0 | 50 | 5.0 | 10.0 | 50 | 6.7 | 10 | 26.7 | 0.60 | 97-98 |

Sum • = $\tau_{1\_total}$ + $0.5 * t_{2F}$ + $t_{2N}$
Ratio R = $\tau_{1\_total}/(0.5 * t_{2F} + t_{2N})$

TABLE 3

Reaction conditions and results from comparative example C1

| Experiment No. | T [°C.] | $NH_3$ metering time [min] | Further reaction time [min] | GFA-is [%] |
|---|---|---|---|---|
| C1 | 30 | 240 | 60 | 93-94 |
| C2 | 35 | 240 | 10 | 91-92 |
| C3 | 35 | 240 | 60 | 94-95 |
| C4 | 40 | 240 | 10 | 92-93 |
| C5 | 40 | 240 | 60 | 93-94 |

The invention claimed is:

1. A process for preparing a mixture comprising at least one compound of the formula (Ia) and at least one compound of the formula (Ib)

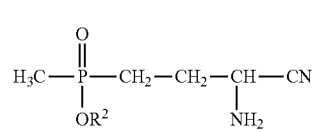

(Ia)

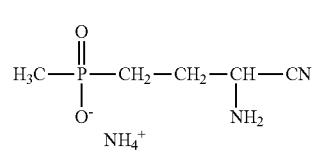

(Ib)

wherein one or more compounds of the formula (II)

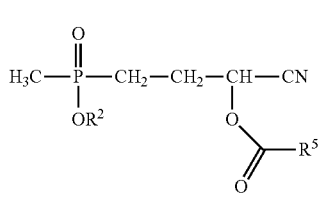

(II)

where in each case:

$R^2$ is $(C_1-C_{12})$-alkyl, $(C_1-C_{12})$-haloalkyl, $(C_6-C_{10})$-aryl, $(C_6-C_{10})$-haloaryl, $(C_7-C_{10})$-aralkyl, $(C_7-C_{10})$-haloaralkyl, $(C_4-C_{10})$-cycloalkyl or $(C_4-C_{10})$-halocycloalkyl, $R^5$ is $(C_1-C_{12})$-alkyl, $(C_1-C_{12})$-haloalkyl, $(C_6-C_{10})$-aryl, $(C_6-C_{10})$-haloaryl, $(C_7-C_{10})$-aralkyl, $(C_7-C_{10})$-haloaralkyl, $(C_4-C_{10})$-cycloalkyl or $(C_4-C_{10})$-halocycloalkyl, are converted in a continuously operated reactor while mixing with $NH_3$ in liquid or supercritical form, where the mixing of the compound(s) of the formula (II) and $NH_3$ is effected under the following parameters:

a mixing time for attainment of a coefficient of variation of 0.10 or less (CoV≤$10^{-1}$) is less than 30 seconds.

2. The process according to claim 1, wherein $R^2$ is $(C_3-C_6)$-alkyl, $R^5$ is $(C_1-C_4)$-alkyl, $(C_6-C_8)$-aryl or $(C_5-C_8)$-cycloalkyl.

3. The process according to claim 1, wherein $R^2$ is $(C_4-C_5)$-alkyl, $R^5$ is methyl, ethyl or isopropyl.

4. The process according to claim 1, wherein the mixing is effected under the following parameters:

the mixing time for attainment of a coefficient of variation of 0.05 or less (CoV≤$5*10^{-2}$) is less than 15 seconds.

5. The process according to claim 1, wherein the continuously operated reactor is a tubular reactor having a length of more than 100 times the characteristic length.

6. The process according to claim 1, wherein a total amount of 2.0 to 3.6 molar equivalents of $NH_3$ is used.

7. The process according to claim 1, wherein the $NH_3$ used is essentially anhydrous, wherein a water content in the $NH_3$ used is not more than 0.5% by weight.

8. The process according to claim 1, wherein one or more compounds of the formula (II) and $NH_3$ each in liquid form are mixed in the reactor.

9. The process according to claim 1, wherein the reaction is effected at a temperature in the range from 10 to 80° C.

10. The process according to claim 1, wherein the reaction is effected at a temperature in the range from 20 to 70° C.

11. The process according to claim 1, wherein the reaction is effected at an absolute pressure of not more than 120 bar.

12. A process for preparing glufosinate

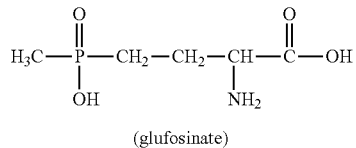

(glufosinate)

or glufosinate a salt, wherein, in this process, a mixture comprising at least one compound of the formula (Ia) and at least one compound of the formula (Ib) is used

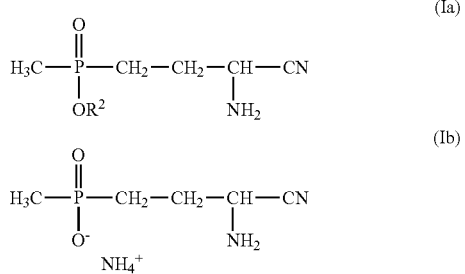

where $R^2$ is $(C_1\text{-}C_{12})$-alkyl, $(C_1\text{-}C_{12})$-haloalkyl, $(C_6\text{-}C_{10})$-aryl, $(C_6\text{-}C_{10})$-haloaryl, $(C_7\text{-}C_{10})$-aralkyl, $(C_7\text{-}C_{10})$-haloaralkyl, $(C_4\text{-}C_{10})$-cycloalkyl or $(C_4\text{-}C_{10})$-halocycloalkyl, are converted in a continuously operated reactor while mixing with $NH_3$ in liquid or supercritical form, where the mixing of the compound(s) of the formula (II) and $NH_3$ is effected under the following parameters:

a mixing time for attainment of a coefficient of variation of 0.10 or less $(CoV \leq 10^{-1})$ is less than 30 seconds.

13. A process for preparing glufosinate or a glufosinate salt comprising steps (a) and (b):

(a) preparing a mixture prepared by a process defined in claim 1 and comprising at least one compound of the formula (Ia) and at least one compound of the formula (Ib), and (b) converting the mixture prepared in step (a) and comprising at least one compound of the formula (Ia) and at least one compound of the formula (Ib) to glufosinate or to glufosinate salts, or (b) using the mixture prepared in step (a) and comprising at least one compound of the formula (Ia) and at least one compound of the formula (Ib) for preparation of glufosinate or of glufosinate salts.

14. The process according to claim 13, wherein, in step (b), an acidic hydrolysis of the nitrile group and the phosphinic ester group to give compounds of formula (Ia) and an acidic hydrolysis of the nitrile group to give compounds of the formula (Ib) are effected.

15. A mixture prepared by a process defined in claim 1 and comprising at least one compound of the formula (Ia) and at least one compound of the formula (Ib) for use in preparing glufosinate or glufosinate salts.

16. The process according to claim 4, wherein the mixing time for attainment of the coefficient of variation of 0.05 or less $(CoV \leq 5*10^{-2})$ is less than 4 seconds.

17. The process according to claim 5, wherein the continuously operated tubular reactor has a length of more than 1000 times the characteristic length.

18. The process according to claim 6, wherein 2.2 to 3.2 molar equivalents is used, each based on the amount of compounds of the formula (II) used.

19. The process according to claim 12, wherein the glufosinate salt is glufosinate sodium, glufosinate hydrochloride, or glufosinate ammonium.

20. The process of claim 13 wherein the mineral acid comprises aqueous HCl (hydrochloric acid).

* * * * *

UNITED STATES PATENT AND TRADEMARK OFFICE
CERTIFICATE OF CORRECTION

| | | |
|---|---|---|
| PATENT NO. | : 11,220,520 B2 | |
| APPLICATION NO. | : 16/769646 | |
| DATED | : January 11, 2022 | |
| INVENTOR(S) | : Kilian Tellmann et al. | |

It is certified that error appears in the above-identified patent and that said Letters Patent is hereby corrected as shown below:

In the Claims

At Column 18, Line 28, "are effected" should be -- are effected with a mineral acid. --.

Signed and Sealed this
Twelfth Day of July, 2022

Katherine Kelly Vidal
Director of the United States Patent and Trademark Office